(12) United States Patent
Schumacher et al.

(10) Patent No.: US 6,532,442 B1
(45) Date of Patent: Mar. 11, 2003

(54) SYSTEM FOR THE FACILITATION OF SUPPORTING MULTIPLE CONCURRENT LANGUAGES THROUGH THE USE OF SEMANTIC KNOWLEDGE REPRESENTATION

(75) Inventors: John F. Schumacher, White Plains, NY (US); Robert Anthony Weida, New York, NY (US); Steffen Michael Fohn, Poughquag, NY (US); Tomi Magome, White Plains, NY (US); Richard Bruce Humphrey, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 238 days.

(21) Appl. No.: 09/629,263

(22) Filed: Jul. 31, 2000

Related U.S. Application Data

(62) Division of application No. 08/974,777, filed on Nov. 20, 1997.

(51) Int. Cl.⁷ .......................... G06F 17/28; G06F 17/20
(52) U.S. Cl. .............................................. 704/2; 704/8
(58) Field of Search ..................... 704/2–7, 8; 707/536, 707/103; 717/1, 8

(56) References Cited

U.S. PATENT DOCUMENTS

| 5,497,319 | A | * | 3/1996 | Chong et al. | 704/2 |
| 5,551,055 | A | * | 8/1996 | Matheny et al. | 704/8 |
| 5,613,122 | A | * | 3/1997 | Burnard et al. | 718/8 |
| 5,652,884 | A | * | 7/1997 | Palevich | 704/8 |
| 5,687,366 | A | * | 11/1997 | Harvey, III et al. | 704/8 |

* cited by examiner

Primary Examiner—Patrick N. Edouard
(74) Attorney, Agent, or Firm—Steven J. Meyers

(57) ABSTRACT

A hierarchial knowledge representation is used in order to more efficiently support the translation and management of multiple localities. Utilizing this type of knowledge representation provides several key advantages. The first is a greater ability to differentiate semantically different symbols within the system. The second, is the ability to reutilize the translation of these symbols once translated a single time; and concurrent locale support.

15 Claims, 8 Drawing Sheets

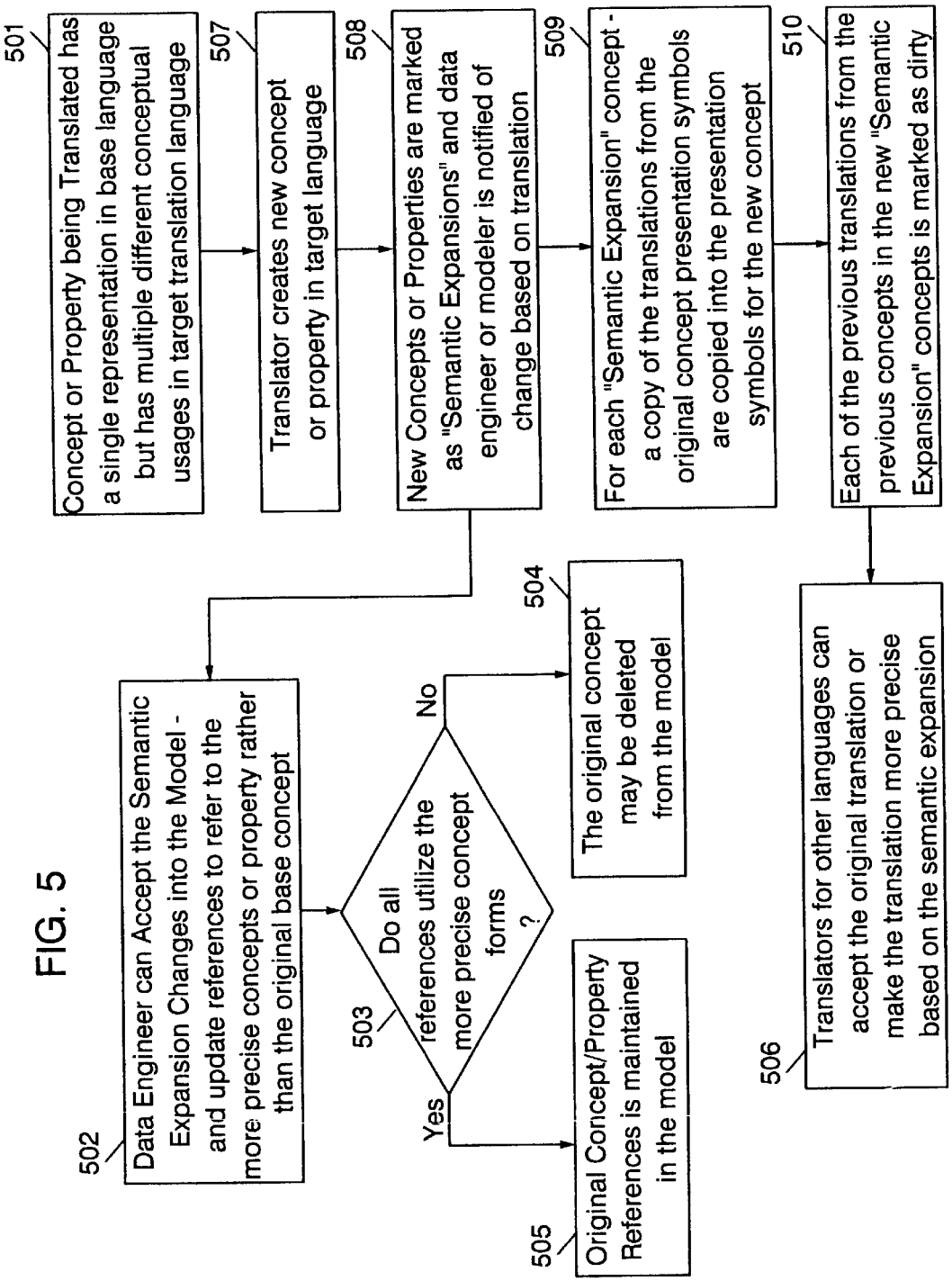

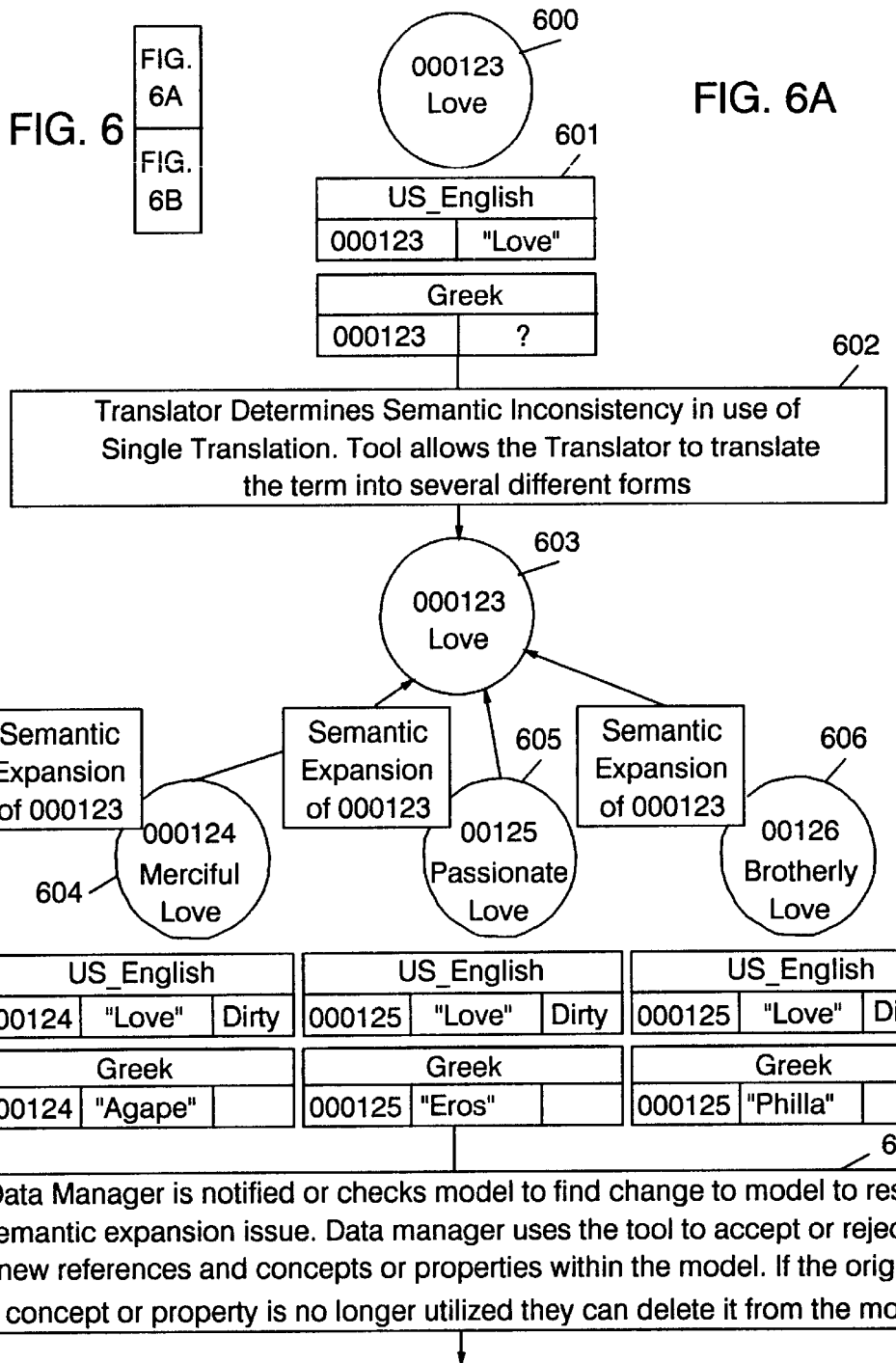

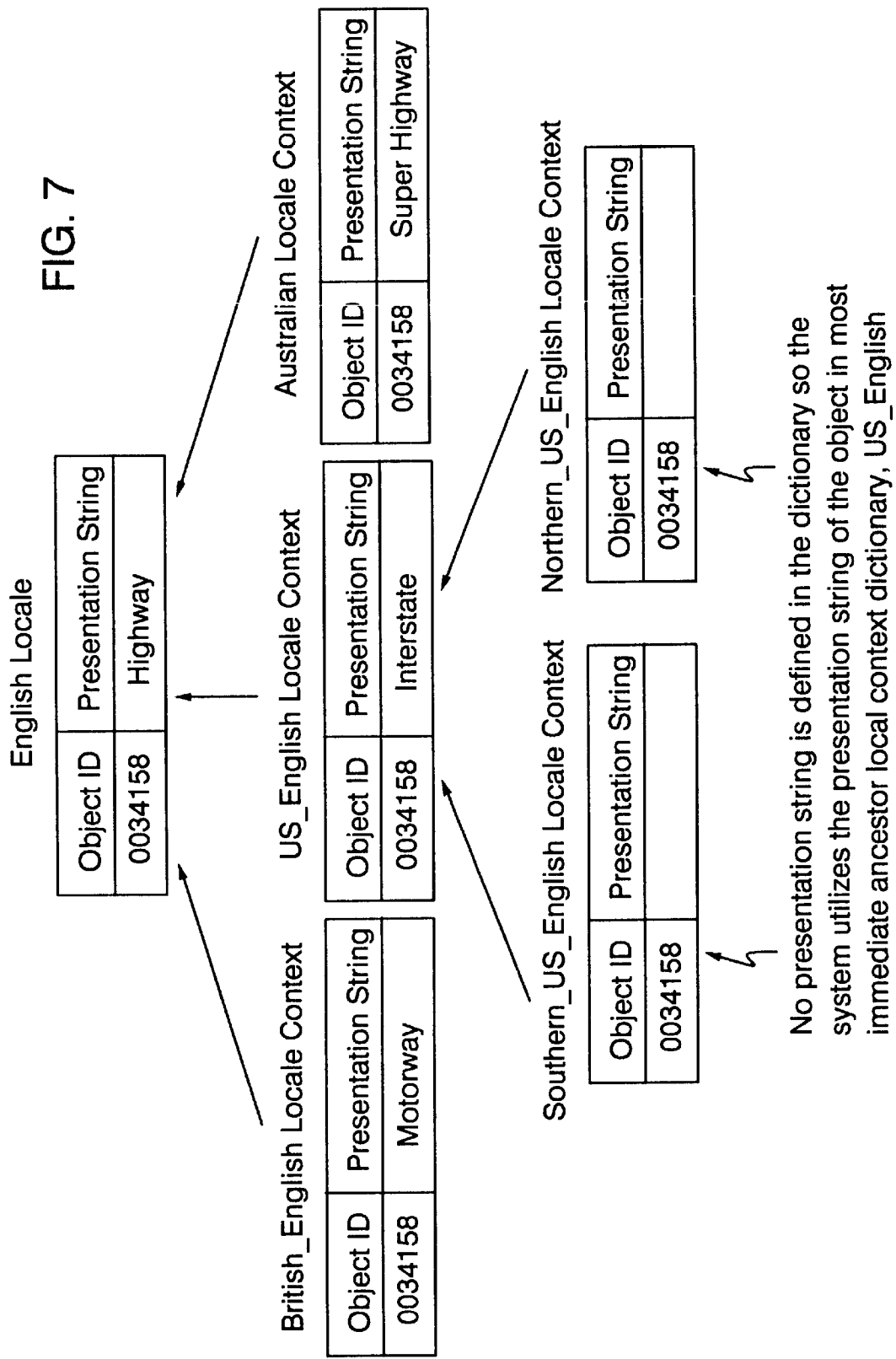

SYSTEM FOR THE FACILITATION OF SUPPORTING MULTIPLE CONCURRENT LANGUAGES THROUGH THE USE OF SEMANTIC KNOWLEDGE REPRESENTATION

RELATED APPLICATIONS

This is a divisional application of U.S. patent application Ser. No. 08/974,777 filed on Nov. 20, 1997.

FIELD OF INVENTION

This system utilizes semantic knowledge modeling to facilitate the management and translation of information across multiple languages, locales, and presentational forms.

BACKGROUND OF THE INVENTION

As companies are becoming increasingly more international in business activities, each country in which a company operates may have different languages. The diversity of these cultures produces a challenge for information systems. Each culture wants the software and data it produces to support the local conventions and cultures. This means that software must be translated for each of these cultures. The cultures can differ in terms of script (written languages used), languages, meaning of pictures and images, currency conventions, address and telephone number conventions, data and time conventions, units of measures commonly used, and many other aspects of the information system.

Typically, the term globalization is used to refer to the process of enabling software to support multiple languages. Globalization involves removing all cultural biased conventions from the software so that the software can more quickly be adapted to the conventions and language of a particular culture. The term localization is used to refer to the process of providing a particular cultural binding of the software. The localization process involves translating the strings, images, and other elements of the system to a form that matches the local conventions of a particular culture.

Further, the cost of translating systems and information can be quite expensive. This cost is particularly high if the information system changes frequently. Each change must be made through all the locales. If a system can not manage the effects of change efficiently, increased costs are the result as unneeded translations are required.

Today, most globalization systems are limited in that their operation is restricted to the resource (e.g., strings, bit maps, etc.), where each resource in the system is placed in a resource file and then translated or localized. These systems are further restricted to loading no more than one resource file at a time, consequently, they are unable to support no more than a single locale at any particular moment in time.

Today's global environment often necessitates that users have access to multiple translations (i.e. locales/locale context) For example within Switzerland, multiple languages are used and they should be able to view information in the language/dialect with which they are most comfortable.

SUMMARY OF INVENTION

The instant inventive system utilizes a hierarchical knowledge representation in order to more efficiently support the translation and management of multiple localities. Utilizing this type of knowledge representation provides several key advantages. The first is a greater ability to differentiate semantically different symbols within the system. The second, is the ability to reutilize the translation of these symbols once translated a single time; and concurrent locale support.

It has become common place in computers to separate the presentation resources from the actual program. The XPG4 standards, as well as operating system standards within Windows, OS/2 and UNIX provide facilities for separation. However, these separations are generally string tables and id translation. The instant systems deal with the separation of strings, any resources, images, sound strings, from source code in the system. They do not utilize a semantic knowledge representation in order to manage resources in a more efficient and meaningful way within the translation process.

The instant system provides several advantages over other systems. First, the system manages information based on semantics not string translation. This allows information to be modeled utilizing object oriented and semantic knowledge engineering techniques. These techniques can reduce the total number of strings within the system. Further, the strings to be translated have cleaner correspondence to the conceptual units of translation rather than dictionary lookups of words.

BRIEF DESCRIPTION OF THE DRAWINGS

FIG. 5 demonstrates semantic expansion during translation.

FIG. 7 shows the dictionaries of a sample hierarchy of locale contexts.

DESCRIPTION OF INVENTION

Figure 1:
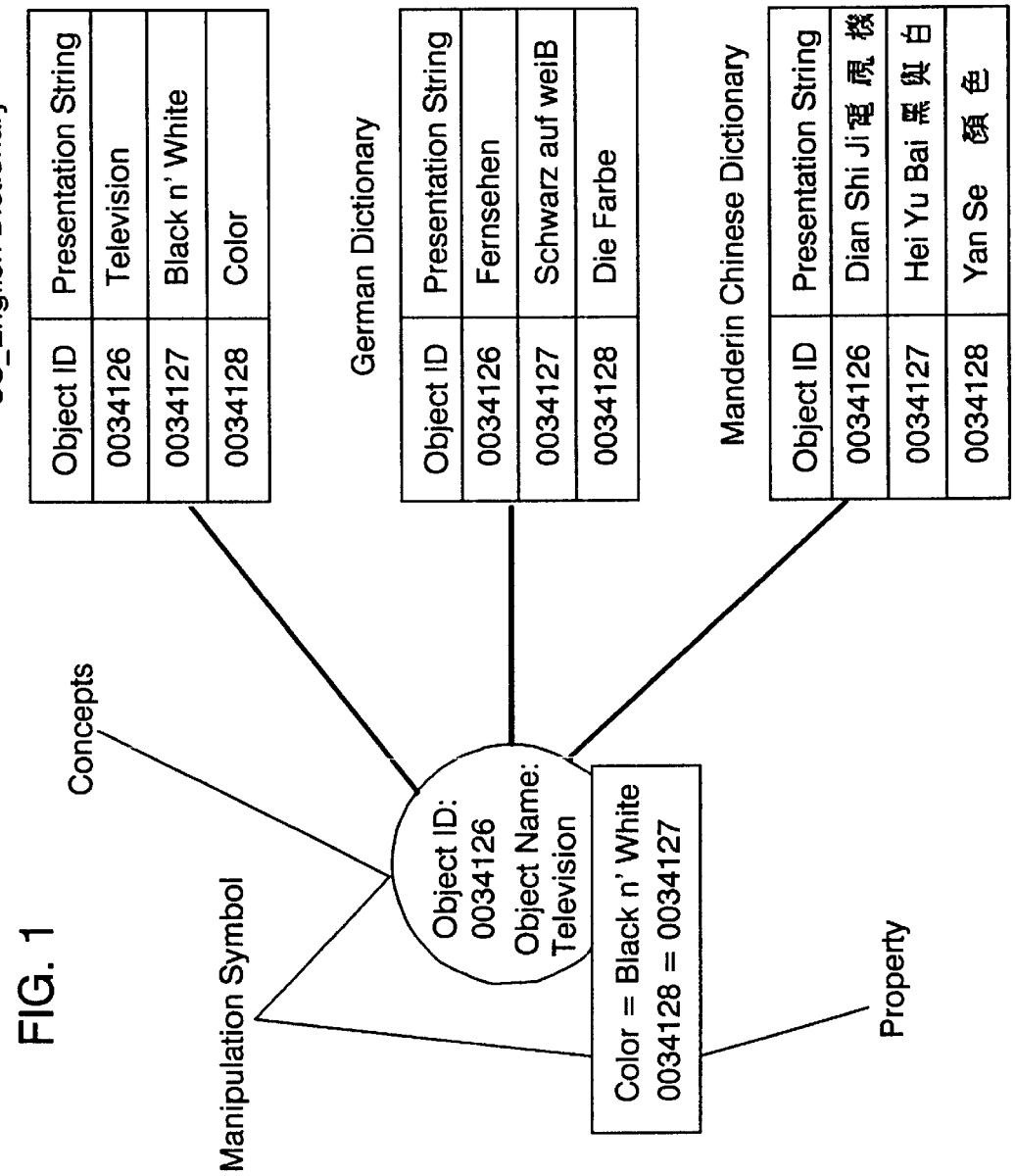
FIG. 1 contains flowchart symbols and translations for a television object.

Every entity (e.g. data object) in the system has a pointer to a list of resource objects. These entities represent the distinct concepts in the system. The system manages information as conceptual units or idioms instead of as text strings, words, or some arbitrary resource. The resource objects represent a set of presentation symbols that are presented to the user as the visual, auditory, or other sensory output for the entity. The resources are grouped into locales or locale contexts. The locale contexts represents a collection of resources which share a common language, set of local cultural conventions, or common set of terminology's and presentation units. These locale context are grouped to make index into the presentation symbols within a particular locale context more efficient.

The heart of our system is the utilization of information management and modeling techniques as a method to facilitate the process of translation and localization of information and a system that adds on to these systems features the facilitation of multi-locale support.

A "concept" is a conceptual unit which represents an object, idea, or thing that we talk about or think about within a particular application domain. When we describe an application the concepts are typically the nouns in the conversation. Concepts can be physical objects in the universe, imaginary objects, data structures within a computer system, or ideas. They are similar to the notion of classes within an object oriented system (Booch 1994, Rumbugh, et al. 1991, Jacobson, et al. 1992 and Coad, 1995).

Further, a concept property is also a conceptual unit whose context is the concept it describes. For example, a conceptual unit "size" may exist in a consumer catalog. The word "size" within this electronic catalog may be used to refer to the size of a shirt and also to the size of a hard drive within this same system. However the two uses of size are unique and must be represented by different and unique concepts or manipulation symbols within our system (e.g. Shirt Size and Disk Size) even though they may both represent themselves to the user as the word "Size" when presented to the user of the system in English. They are unique because the measure and meaning of the word size when it refers to a shirt is different than the measure and meaning of the word size when it refers to a hard drive.

Similarly, if we have two different computers both with hard drives, they both utilize the same conceptual unit of size for those hard drives. Therefore, the conceptual unit of size is common for both, even though the concept refers to two different entities within the catalog. It should also be noted that a conceptualization may encompass conceptual units, their properties, and values of those properties. All these entities are subject to translation. Consider:

---

*Concept RedShoe extends Shoe*
{
    *Color = red;*
{

---

This example introduces a concept named RedShoe which is derived from another concept named Shoe (not shown). It has a color property whose value is red. Concepts represent new types within the instant system.

"Properties" are scoped characteristics or attributes of a concept. Concepts and properties are both conceptual units.

Computers are systems that contain and manipulate symbols. Conceptual units are represented and manipulated as symbols within in instant system. Symbols are abstractions that represent conceptual units within the universe. The instant system differentiates two types of symbols: (1) Manipulation Symbols and (2) Presentation Symbols.

Manipulation Symbols

This is the internal representation symbol that is primarily used for the computer for manipulation and storage retrieval. This symbol is not generally used for presentation purposes. The manipulation symbol may in fact exist in two forms. An internal object id form that is computer efficient but is not generally human readable and an object name, a form that is human readable but still a manipulation symbol that is generally not used for end-user presentations of the symbol. The object name form is an alias for the object id to help in the system and working with the system.

Presentation Symbols

These are symbols that are presented to the user to facilitate their interaction with the system. In the context of this system, translation can be substituting words, phrases, images, sounds or any other form of multi-media content to those which are more familiar or correct for a particular locale.

For each concept within the system there is a single manipulation symbol. This symbol may be associated with one or more presentation symbols. A named group of presentation symbols make up a locale context. These locale context may be based on an internationalization standard such as XPG4 or the POSIX locales or it may correspond to a user defined context. User defined locales can be two or more translations or sets of presentation symbols both for US English. However, one could utilize "domain expert" terminology while the other utilizes novice terminology. For example a concept referring to laptop displays may have the presentation string "Display Resolution" in an U.S. English Expert locale context, but utilize the presentation string "Screen Clarity" in a U.S. English novice locale context. These locales might also have the values "1600×1200" as a presentation string for a concept that represents one of the values for this concept in the U.S. English Expert locale context and might utilize the presentation string "Extremely Clear" in the U.S. novice locale context. Given run-time support for multiple concurrent locales, note that different translations choices can be made on a fine-grained basis (e.g., concept by concept) during the course of a single user session.

The separation of manipulation symbols from presentational symbols and the use of definitions of locales is a common practice in systems that support multiple languages. However, in most traditional systems these bindings from manipulation sources to presentation symbols are statically defined. A system loads one resource file at a time and runs in the locale supported by the locale. In our system the design support the concurrent use of multiple locales at the same time. Therefore, a user can have presented to them information in multiple locales at the same time. In this patent application the concurrence within the system is important as part of the facilitation of translation.

Note that in FIG. 1, above the left-hand side represents the manipulation symbols (the human non-readable ids in addition to the human read readable object names—see the Symbols section) while the right-handside represents the locale specific presentation symbols translated from the corresponding human under-standable manipulation symbols. Further, most traditional systems do not break translation up into "conceptual" units. Instead, most globalization systems work at the string level. Each string in the system can be placed in a resource file and then translated.

Concepts in the instant system are types. Further, the information within a concept is typed. For example, its "name" may be of type string with a particular value such as "myConcept" More over a concept may have properties such as "my Sizes" of type Size, with values, small, medium and large.

Base and Default Locales: The knowledge representation utilizes a locale called the base locale. The base locale in which the object name symbols are defined and which is used for the base representation for types, particularly in systems where conversions are supported. In other words, the object name symbols of the base locale serves as the human readable manipulation symbol discussed earlier.

There can also be a default locale within the system. The default locale is the locale that is used in the system for presentation purposes when a user does not specify a different locale either explicitly or implicitly. This is typically the same as the base locale but does not necessarily need to be the same. The default locale is typically the locale that is most likely to be used by the users of the system. The base locale on the other hand is chosen to facilitate translation.

For example, English is a well known language by people from many different countries in the world. It is a good "common language" that is understood by many translators and can act as a base language for translation. If we want our catalog to support English, French, Japanese and Russia, it may be difficult to find a single translator who knows all three languages. Instead, we can initially provide our catalog in English We can then hire translators who know English-French translation, English-Japanese translation, and English-Russian translation. In this case English is our basic locale.

If our company is located in Japan and if most users of our site will speak Japanese as their primary language, then we may want the Japanese locale to be the default locale rather than English. However, since English is a more common language in international communities, it is still a better choice as the base language on which translation is based for the system. Referring back to FIG. 1, note that the object name manipulation symbols form the base locale. Given that the U.S_English dictionary is the default locale, then this is an example of where the base local represents the default locale.

Locale Context: A locale may have zero or many contexts within it. Similarly, it is possible that a context can also have zero or more children contexts and so forth. The end result is the creation of a locale hierarchy, where locale contexts exist as children. For example FIG. 1.2 represents Dictionaries of a sample hierarchy. Consider the following, English is a locale where US_English, British_English, and Australian_English are contexts within the locale. Consider further, that within the US_English context there exists the Southern_US_English context and the Northern US_English context. The English locale represents those presentation symbols which are common to US_English, British_English and Australian_English, while US_English represents those presentation symbols that are common to both Southern_US-English and Northern_US_English. Given this example, a system would utilize a locale hierarchy in the following manner. Assume that the system is operating in the Southern_English context. When presentation symbols are specifically defined for the current context they will be used in the presentation for the locale context. On the other hand, all presentation symbols not specifically defined for the current context are retrieved from the most immediate ancestor context; so if a presentation symbol is not located in the Southern_US-English context, the system will default to the corresponding presentation symbol in the most immediate parent context in which the symbol is defined, in this case is US_English. Locale hierarchies offer reusability of presentation symbols in related locale contexts.

Dictionary Creation, Translation, and Modification Process

Figure 2:
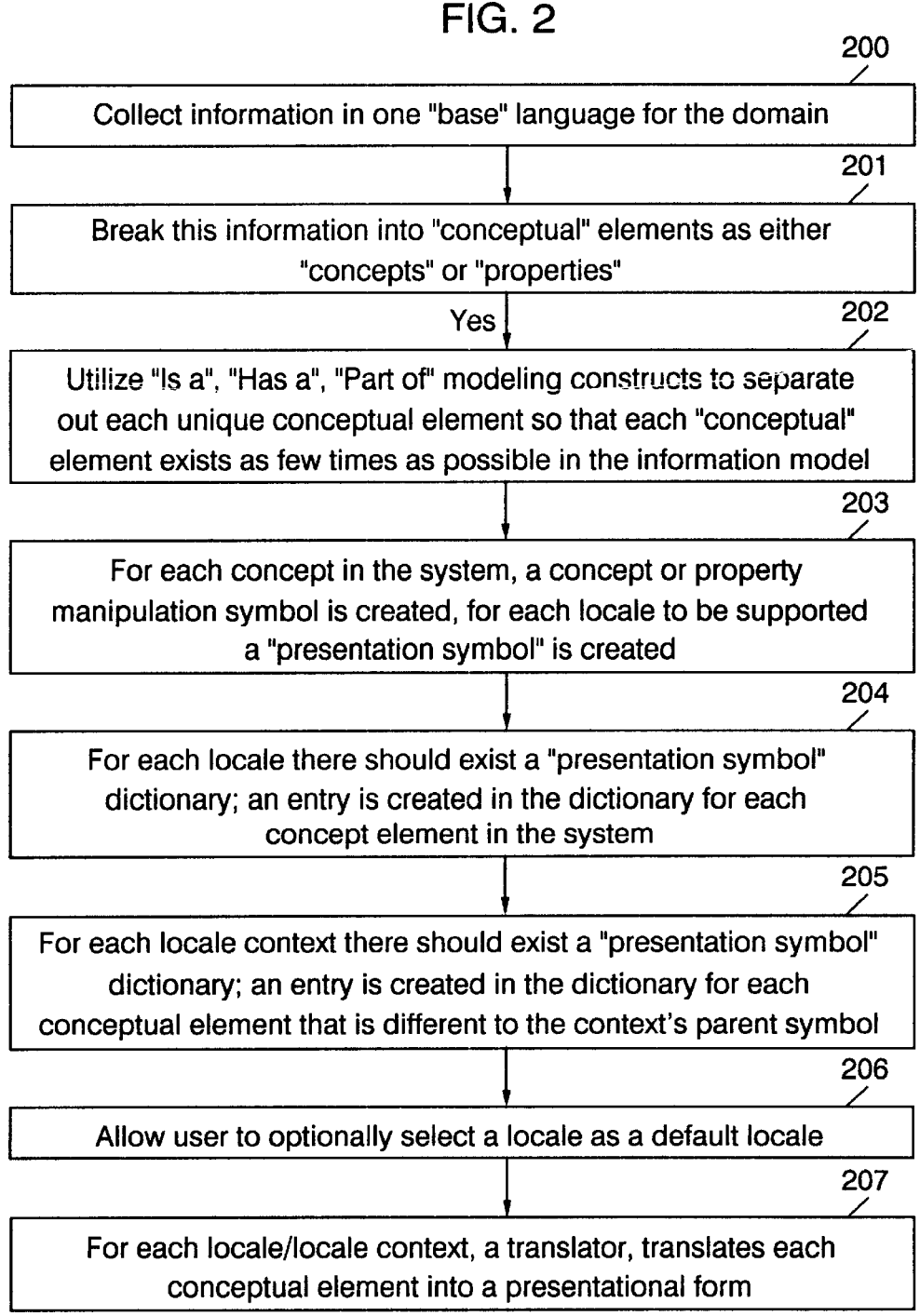
FIG. 2 is a flowchart of the creation and translation process of locale/locale context dictionaries.

The process within our system, as shown in FIG. 2, leverages the usage of good information management and modeling techniques. The translation system provides a method for the user's to manage information based on a semantic knowledge representation. This knowledge representation uses techniques from Object Oriented Modeling and AI Knowledge Representation systems to reduce the number of "conceptual" elements for translation.

This process can be seen in FIG. 2, the creation and translation process of locale/local, context dictionaries. The process begins by collecting information in one "base" language for the domain 200. This is followed by breaking the information into "conceptual" elements as either a "concepts" or "properties" 201. Then utilize "Is a", "Has a", "Part of" modeling constructs to separate out each unique "conceptual" elements so that each "conceptual element exists as few times as possible in the information model 202. Now, for each concept in the system, a concept or property manipulation symbol is created, for each locale to be supported a "presentation symbol" is created 203. Then for each locale there should exist a "presentation symbol" dictionary; an entry is created in the dictionary for each concept element in the system 204. The process is then continued, and for each local context there should exist a "presentation symbol" dictionary; an entity is created in the dictionary for each conceptual element that is different to the contexts parent symbol 205. Then allow user to optionally select a locale as the default locale 206. Then for each locale/locale context, a translator, translates each conceptual element into a presentational form 207.

Hierarchical Knowledge Representation

The instant system utilizes a hierarchical knowledge representation. Further, this system utilizes inheritance hierarchies similar to object oriented systems. In these types of systems a entity or concepts can be described or defined as an extension of another concept or entity in the system. For example the following is a simple example of this type of hierarchical knowledge representation.

A typical hierarchical knowledge representation system supports the construction and manipulation of a conceptual model. Such a model includes descriptions of concepts or frames, such as a company, together with their instances, such as IBM or Compaq. Concepts are organized into a taxonomy based on generalization relationships, so that more general concepts are higher in the taxonomy than their specialization's, e.g., company subsumes computer company, which subsumes software company, and so on. Concepts and their instances are also described in terms of their properties. For example, company might have an employee property whose values are constrained to be of type human. Properties can be "inherited" from a concept to its subconcepts as well as its instances, so that computer company, software company, and IBM would all have employee property too.

Such systems separate semantically different concepts. This allows a more precise translation process. Semantic concepts can be very different across cultures. For example, the single word "Rice" in English has many different representations in Japanese cultures.

Another example involves the word "Size". In a typical product catalog the word size is an extremely heavily used word concept. However, the meaning of the word size can be very different depending on what type of product is being described. Size is very different when describing shoes than describing memory within a computer. By utilizing the hierarchical knowledge representation these strings are cleanly separated and translation can be facilitated to those most appropriate terms.

Further, a hierarchical knowledge representation facilitates the reuse of semantically similar symbols across a knowledge space. For example, if the word "Size" is used in the same semantical way within several different products descriptions, the translation of the word size only needs to occur once.

Figure 3:
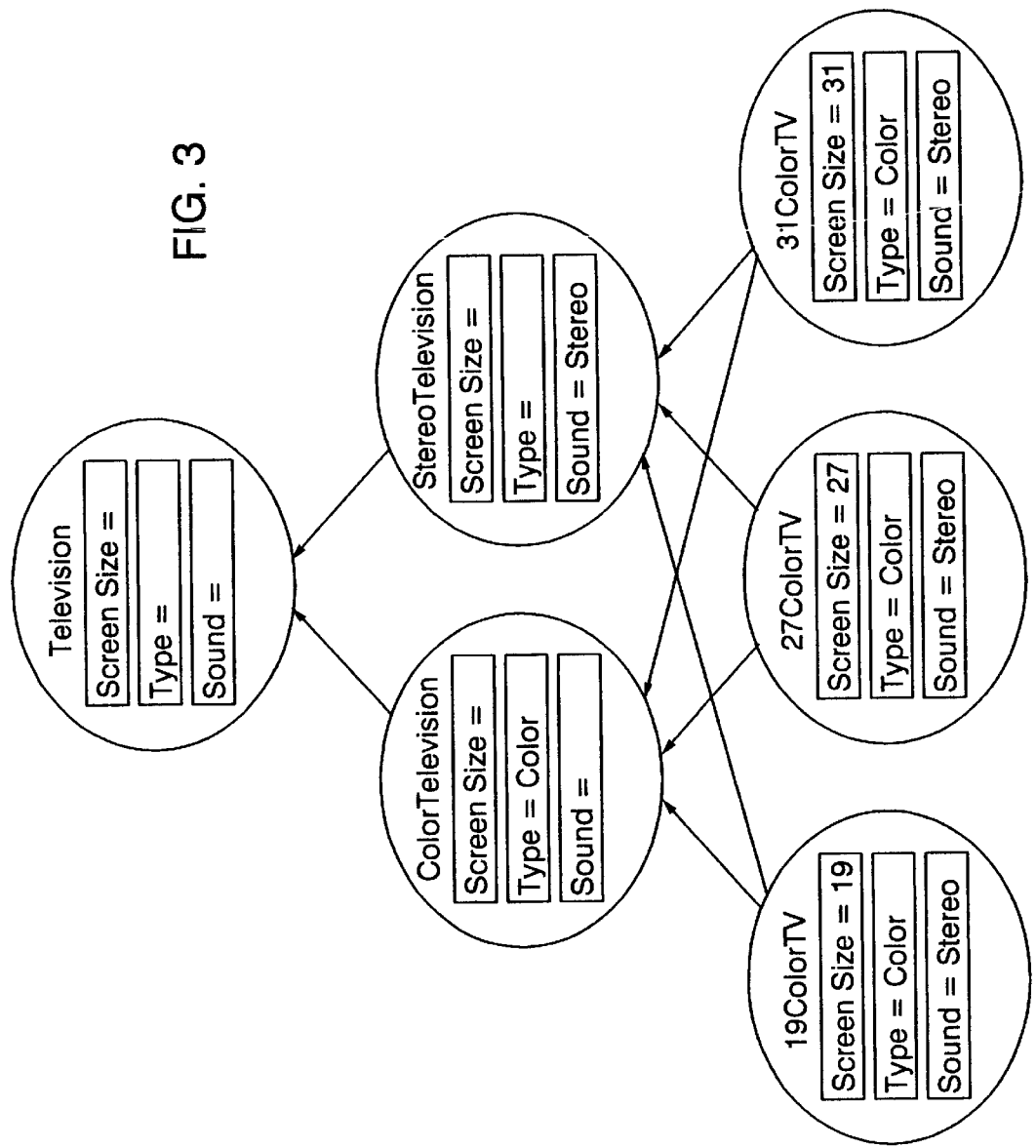
FIG. 3 is a sample hierarchial knowledge representation.

FIG. 3 shows a sample knowledge representation hierarchy of Televisions. Notice the reuse of the attributes: Screen Size, Type, and Sound; the attributes are declared once in the Television concept and reused in all descendent concepts. In addition notice the reuse of attribute value assignments, for example the assignment Type=Color in the Color Television concept, that is reused in all three of the descendants.

The system uses a frame based semantic knowledge representative system in order to minimize the amount of translation that must be done. Semantic symbols are only represented in the system a single time. Then the symbol and its translation are inherited by other concepts that need them. For example, a Japanese translation for shoe might be inherited as the translation for dress shoe and casual shoe, in the absence of more specific translations. This is different than the string substitution method used in some other systems. Two strings which are syntactically similar may be semantically different. This underlying semantic difference produces a problem during translation since the strings are translated the same way for each language and can produce semantic inconsistencies.

The knowledge representation has the feature that symbols are separated by their semantics and that symbols with a common semantic point to a common symbol. This provides an advantage in translation and the management of translation in that each symbol only needs to be translated one time.

Further, even for systems that allow the reuse of presentation symbols, such as resource files, our system provides a means of logically organizing the presentational symbols. Other systems utilizing facilities such as resource files allows the user to reutilize strings many places within the system but provide no support to help manage these resource strings and presentation symbols. Therefore, maintenance and updates of the resources is a difficult task.

While many aspects of a given model may be application specific, others are rather general. A hierarchical knowledge representation scheme such as we have described is well suited for building models which include pre-existing components., e.g. for units of measure, can be built once, translated once per target language, and reused across many applications such as shown in FIG. 3. This describes the hierarchical knowledge representation scheme where one translation per target language is being reused for a Television, with parameter considerations of type, Screen Size, and Sound.

Aggregations and Collections in Knowledge Representation

Another common form of data reduction in object orientated and other knowledge systems is the use of aggregations and collections. Information can be defined once by many different systems that use that information as a subassembly. For example, several computer systems sold by a computer component may use the same CPU. This CPU could be described in one concept but then utilized in all of the concepts. If the different systems reference the concept rather than explicitly redefine it, then the information only needs to be translated one time.

Translation Modifications

The system keeps information about when a modification has been performed on either the manipulation symbol or any form of the presentational symbols. If a modification occurs the related symbols in other locales and locale context are marked as "dirty". This indicates that they potentially need to be modified as well. In general, translators can be notified whenever a symbol in a locale for which they are responsible must be reviewed due to changes in the model. This practice of notification can significantly reduce the time necessary to implement changes while assuming the consistency of information presented to users.

The user making the modification can optionally indicate that the modification does nor require modification across related locales and locale contexts (e.g. sibling, descendent, and ancestor locale context). For example, if in one of the languages a word was misspelled but the wording or semantics are not actually changed, their is no need to perform modification or even check the need for modification across all of the other related presentational symbols for each of the other locales and locale contexts supported FIG. 4 shows a flow diagram of the translational modification process.

Further more, the knowledge base's hierarchical organization can be exploited to propagate dirty marks when modifications have non-local effects. For example, suppose that we have a Japanese translation for shoe. If it is decided to remove the shoe concept while retaining the dress shoe and casual shoe concepts, their inherited translation might be lost. Alternatively, if the translation of shoe is changed for arbitrary reasons, the new translation might be less appropriate for dress shoe and casual shoe, increasing the importance of providing them with their own translations. In such cases, dress shoe and casual shoe should be marked as dirty even though they are not directly affected. Similarly, a translation may be effected when a concept is repositioned in the taxonomy. Suppose, a particular shoe inherits its translation from ancestor concept, casual shoe. If another ancestor concept with its own translation is added, say waterproof shoe, it may become unclear which translation should be inherited. Again, the affected concept and its descendants should be considered dirty.

Figure 4:
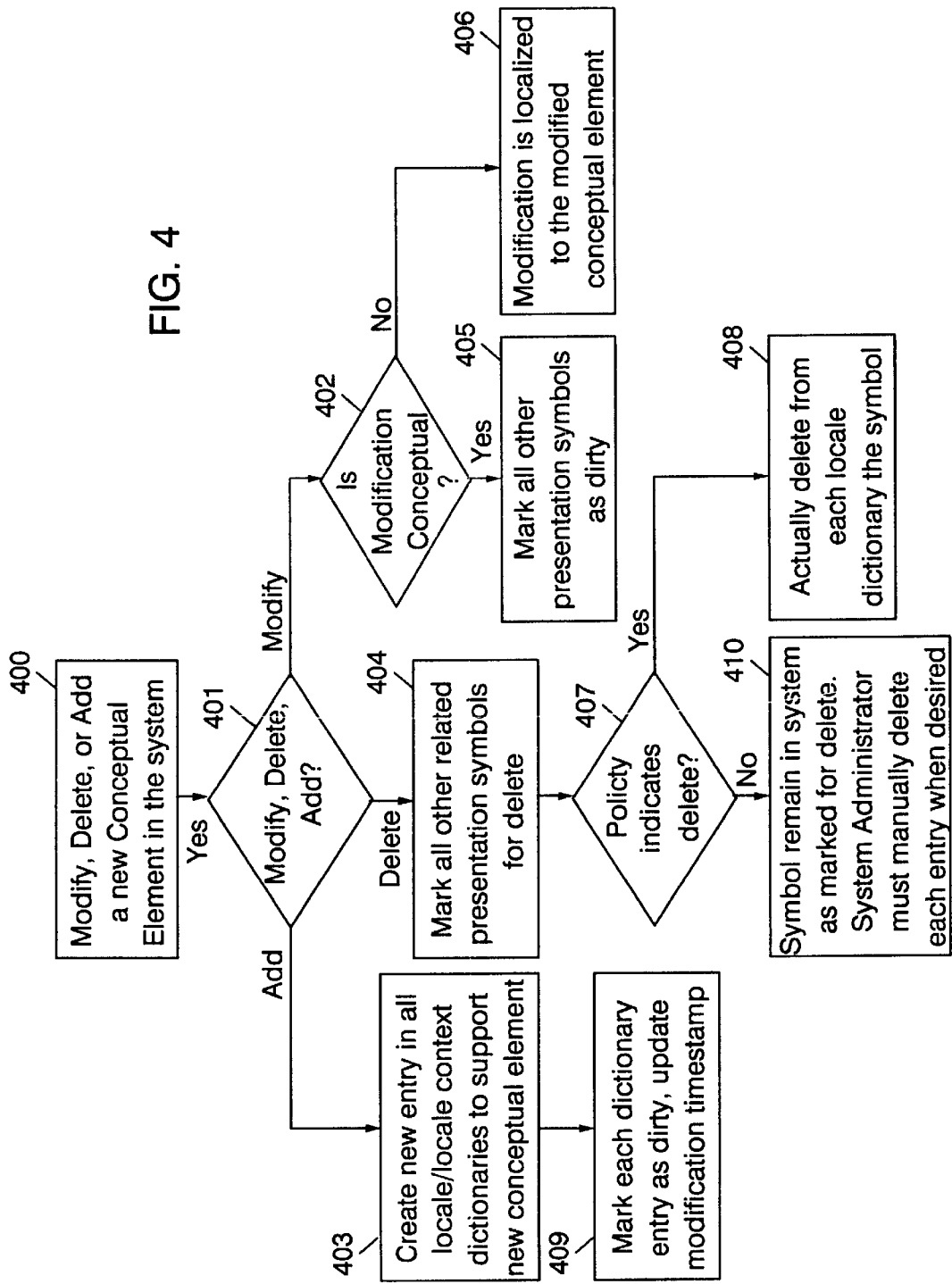
FIG. 4 is a flowchart for the translation modification process.

The process starts FIG. 4 with the act to either Modify, Delete or Add a New conceptual unit in the system. The system then asks whether the user desires to Modify, Delete, or Add at 401. If the selection is to add a concept, is created at 403 in the system, and the process moves on to 409, where the system marks each dictionary entry as dirty and updates the modification timestamp. If the user at 401, decides to delete, then the process moves on to the next action at 404. The system then marks all other presentation symbols or the concept unit symbol for delete and the process moves to 407, where the system queries whether the Policy indicates delete. If the answer is yes then the system proceeds to 408 where the it actually deletes from each locale dictionary the symbol. However if the answer to said query is no, then the symbol remains in the system as marked for delete. Then the system Administrator must manually delete each entry when desired.

If the answer to the initial query at 401 is to Modify, then the system queries whether 402 the modification is conceptual. If the answer is yes 405, then all other presentation symbols are marked as dirty. If on the other hand, the answer to 402 is no, then the Modification is localized to the modified concept 406.

Semantic Expansion During Translation

Humans think in their own language. The expressiveness of words we know within a language directly effects the way we represent and think about things in our world. Therefore, as translation occurs within a system the language being used to express the concepts and semantics within that system are also changing and may become more or less expressive. Therefore, to facilitate the translation process the system can optionally support facilities for semantic expansion during translation the process.

For example, the word "love" is an over used term in English. English utilizes the word love in a multitude of contexts, to refer to a "passionate sexual love", to refer to ones "love for a family member, friend or brotherly love", or to refer to inanimate objects that we really like such as ice cream. In Greek each of these meanings of love has a unique word in the language that clearly distinguishes the differing semantics. If a system is being translated from English to Greek and only one concept has been cleared to express the concept of love, then the Greek translator could choose the most appropriate Greek form of the word love. However, because of the original English author biases they may have actually used what appeared to them as a single concept "love" in multiple contexts in the Greek translation of the word love. The system therefore must provide a facility to support semantic concept expansion during translation. The concept "love can be split into" "passionate love", brotherly love, and "like very much" Each of these can then be appropriately translated.

Generally, compression is less of an issue. Because the translation is done on presentational forms of strings the same word can be used several times without effect to the semantic processing of different symbols within the system. Compression may be less widely useful than expansion, because of potential for losing different nuances inherent in the original model.

The concept of Semantic Expansion During Translation is described in FIG. 5. As noted in 501, the concept or property being translated has a single representation in the base language but has multiple different conceptual usage's in target translation languages. The translator then creates a new concept or property in the target language 507. The new Concepts or properties are marked as "Semantic Expansions" and data engineer or modeler is notified of change based on translation 508. For each "Semantic Expansion concept 509, a copy of the translations from the original concept presentation symbols are copied into the presentation symbols for the new concept. Then each of the previous concepts in the new "Semantic Expansion" concepts is marked dirty 510. The translator for other languages can 506, accept the original translation or make the translation more precise based on the semantic expansion.

The Data Engineer at 508 if desired, can accept at 502 the Semantic Expansion Changes into the Model-and update references to refer to the more precise concepts or property rather than the original base concept. Then the question is raised as to whether the original concept or property is still referenced 503. The answer is no 504 if all references utilize the more precise concept forms, the original concept may be deleted from the model if it provides no importance. However, if the answer to 503 is yes, then the original Concept/Property Reference is maintained in the model 505.

Figure 6B:
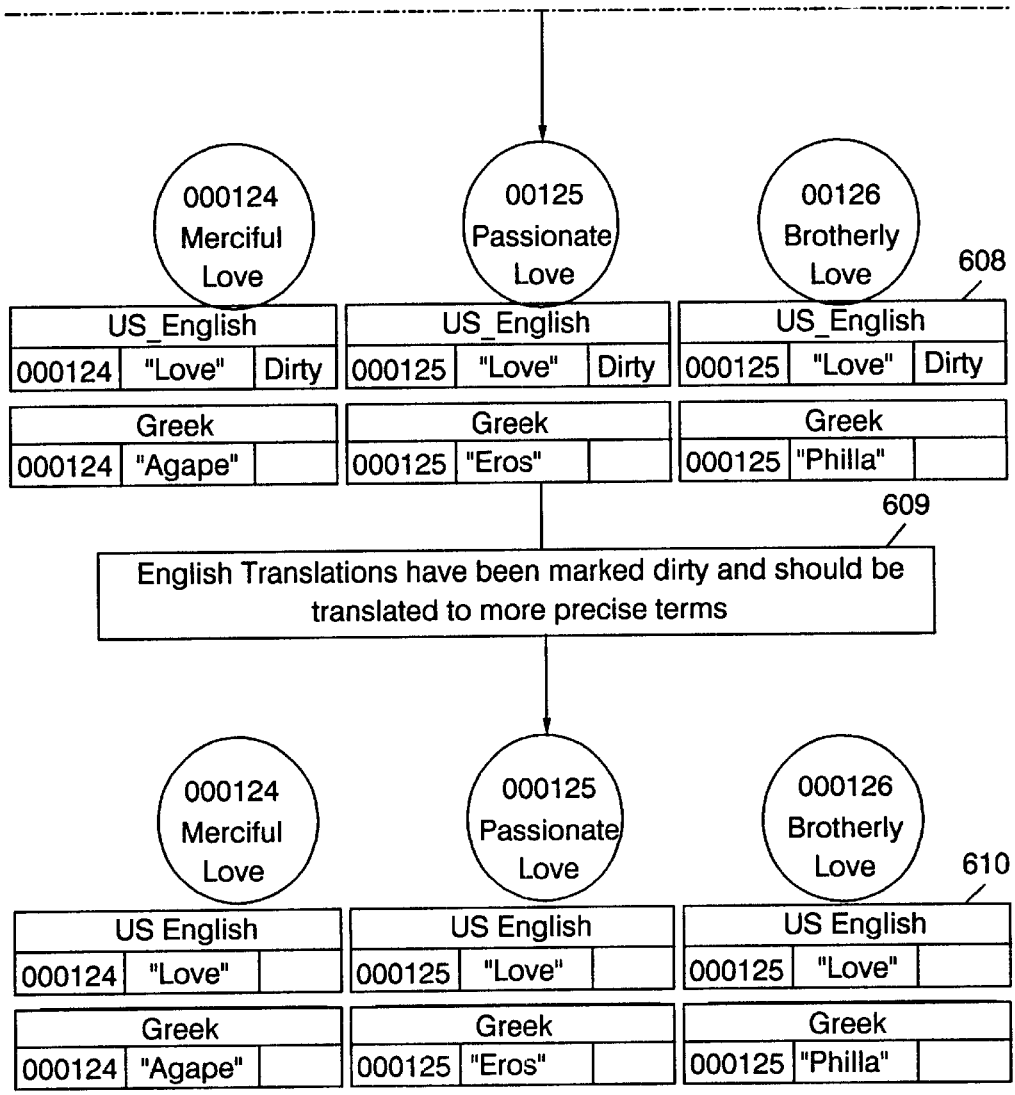
FIG. 6 is an example of how the term Love is translated into Greek from English.

Let us review the Flowchart FIG. 6 regarding, for example, the term Love as it pertains to a translation into Greek from English as shown in 600. The Translator determines Semantic Inconsistency in the use of Single Translation. The Tool allows the Translator to translate the term into several different forms 603. These are Merciful love 604, passionate love 605 and Brotherly love 606. The Data Manager 607 is notified or checks model to find change to model, to resolve semantic expansion issue 608. The Data manager uses the tool to accept or reject the new references and concepts or properties within the model. If the original concept or property is no longer used they can delete it from the model. Thus the English Translation is marked dirty and can be translated to more precise terms 609 and further 610.

What is claimed is:

1. A method of facilitating the translating from a single base source language to multiple target languages comprising the steps of:

a) utilizing a hierarchical knowledge representation of the terms and rules for both the source and target languages;

b) linking corresponding concepts containing presentation symbols in the single base source language and the multiple target languages by a single machine readable manipulation symbol in the single base source language which manipulation symbol is not a presentation symbol;

c) providing child concepts containing only semantically different user readable presentation symbols not found in parent or ancestor concepts;

d) using inheritance of presentation symbols from the parent or ancestor concepts for the non-included symbols in the child concepts in translating from the source to target language;

e) having at least one sublanguage within a hierarchial knowledge representation of concepts of one language which sublanguage is represented as child concepts inheriting presentation symbols from parent language concepts which are concepts of the one language; and f) providing hierarchial knowledge representations of translations of terms and rules of multiple languages made from the single base source language.

2. The method of claim 1, including the step of providing for a default language other than the base language to be used in presentations to a user when no other language is indicated for presentation.

3. The method of claim 2, including the step of providing multiple meanings of a single term as child concepts of a parent concept representing the term.

4. The method of claim 2, including software for providing notification to expand a concept in a source language when a term in a target language is expanded to include subconcepts representing multiple meanings of the term.

5. The method of claim 2, including the step of using the steps of said method to translate software and data produced by said software.

6. A computer implemented software product for use in translating from a single base source language to multiple target languages comprising:

a) software for utilizing a hierarchical knowledge representation of the terms and rules for both the source and target languages;

b) software for linking corresponding concepts containing presentation symbols in the single base source language and the multiple target languages by a single machine readable manipulation symbol in the single base source language which manipulation symbol is riot a presentation symbol;

c) software for providing child concepts containing only semantically different user readable presentation symbols not found in parent or ancestor concepts;

d) software for using inheritance of presentation symbols from the parent or ancestor concepts for the non-included symbols in the child concepts in translating from the source to target language;

e) software for having at least one sublanguage within a hierarchial knowledge representation of concepts of one language which sublanguage is represented as child concepts inheriting presentation symbols from parent language concepts which are concepts of the one language; and f) software for providing hierarchial knowledge representations of translations of terms and rules of multiple languages made from the single base source language.

7. The product of claim 1, including software for providing for a default language in the system other than the base language to be used automatically in presentations to a user when no other language is indicated for presentation.

8. The product of claim 7, software for providing multiple meanings of a single term as child concepts of a parent concept representing the term.

9. The system of claim 8, including software for notification to expand a concept in a source language when a term in a target language is expanded to include subconcepts representing multiple meanings of the term.

10. The system of claim 9, including software for using said system to translate software and data produced by said software.

11. A computer implemented software product providing a method for use in translating from a single base source language to at least one target language, said method comprising the steps of
   a) utilizing a hierarchical knowledge representation of the terms and rules for both the source and target languages;
   b) linking corresponding concepts containing presentation symbols in the single base source language and the multiple target languages by a single machine readable manipulation symbol in the single base source language which manipulation symbol is not a presentation symbol;
   c) providing child concepts containing only semantically different user readable presentation symbols not found in parent or ancestor concepts;
   d) using inheritance of presentation symbols from the parent or ancestor concepts for the non-included symbols in the child concepts in translating from the source to target language;
   e) having at least one sublanguage within a hierarchial knowledge representation of concepts of one language said sublanguage is represented as child concepts inheriting presentation symbols from parent language concepts which are concepts of the one language; and
   f) providing hierarchial knowledge representations of translations of terms and rules of multiple languages made from the single base source language.

12. The method of claim 11, including the step of providing for a default language other than the base language to be automatically used in presentations to a user when no other language is indicated for presentation.

13. The method of claim 12, including the step of providing multiple meanings of a single term as child concepts of a parent concept representing the term.

14. The method of claim 13, including the step of providing for expansion of a concept in a source language when a term in a target language is expanded to include subconcepts representing multiple meanings of the term.

15. The method of claim 14, including the step of using the steps of said method to translate software and data produced by said software.

* * * * *